US006558607B1

(12) United States Patent
Winter et al.

(10) Patent No.: US 6,558,607 B1
(45) Date of Patent: May 6, 2003

(54) CRYSTALLIZATION OF CONSTRAINED POLYMERS

(75) Inventors: H. Henning Winter, Amherst, MA (US); Griffin Gappert, Amherst, MA (US)

(73) Assignee: University of Massachusetts, Amherst, MA (US)

( * ) Notice: Subject to any disclaimer, the term of this patent is extended or adjusted under 35 U.S.C. 154(b) by 0 days.

(21) Appl. No.: 09/676,145

(22) Filed: Sep. 29, 2000

Related U.S. Application Data

(60) Provisional application No. 60/157,201, filed on Sep. 30, 1999.

(51) Int. Cl.[7] .............................................. B29C 44/00
(52) U.S. Cl. ........................ 264/425; 264/41; 264/50; 264/53
(58) Field of Search ........................ 264/41, 50, 425, 264/53

(56) References Cited

U.S. PATENT DOCUMENTS

| 4,548,990 | A |   | 10/1985 | Mueller et al. ............. 525/123 |
| 5,128,382 | A |   | 7/1992 | Elloitt, Jr. et al. .......... 521/178 |
| 5,158,986 | A |   | 10/1992 | Cha et al. ...................... 521/82 |
| 5,160,674 | A | * | 11/1992 | Colton et al. ................. 264/50 |
| 5,189,070 | A |   | 2/1993 | Brownscombe et al. ...... 521/64 |
| 5,200,433 | A |   | 4/1993 | Beshouri ...................... 521/64 |
| 5,210,104 | A |   | 5/1993 | Bass et al. .................... 521/64 |
| 5,252,619 | A |   | 10/1993 | Brownscombe et al. ...... 521/64 |
| 5,252,620 | A |   | 10/1993 | Elliott et al. ................ 521/149 |
| 5,290,820 | A |   | 3/1994 | Brownscombe et al. ...... 521/64 |
| 5,306,733 | A |   | 4/1994 | Adamski et al. .............. 521/63 |
| 5,334,621 | A |   | 8/1994 | Beshouri ...................... 521/64 |
| 5,340,842 | A |   | 8/1994 | Adamski et al. .............. 521/64 |
| 5,358,974 | A |   | 10/1994 | Brownscombe et al. ...... 521/64 |
| 5,362,762 | A |   | 11/1994 | Beshouri ...................... 521/64 |
| 5,565,142 | A |   | 10/1996 | Deshpande et al. ...... 252/315.2 |
| 5,605,727 | A |   | 2/1997 | Bouteiller ....................... 428/1 |
| 5,710,187 | A |   | 1/1998 | Steckle, Jr. et al. .......... 521/64 |
| 5,840,774 | A |   | 11/1998 | Ehrlich et al. ............... 521/61 |
| 5,866,053 | A |   | 2/1999 | Park et al. .................... 264/50 |
| 5,885,494 | A |   | 3/1999 | Venkataraman et al. ... 264/46.5 |

OTHER PUBLICATIONS

Whaley et al., "Phase Equilibria of Polypropylene with Compressed Propane and Related Systems. 1. Isotactic and Atactic Polypropylen and propane Propylene", *Macromolecules* 1997, 30, 4882–4886.

Whaley et al., "Phase Equilibria of Polypropylene with Compressed Propane and Related Systems. 2. Fluid–Phase Equilibria of Polypropylene with Propane Containing Alcohols as Cosolvents and of Some Other Branched Polyolefins with Propane", *Macromolecules* 1997, 30–4887–4890.

Beaucage et al., "Nano–Structured, Semicrystalline Polymer Foams", *Journal of Polymer Science: Part B: Polymer Physics*, 1996, 34, 3063–3072.

(List continued on next page.)

Primary Examiner—Allan R. Kuhns
(74) Attorney, Agent, or Firm—Fish & Richardson P.C.

(57) ABSTRACT

The invention provides micro- and nano-porous materials made from crosslinked polymers crystallized from supercritical fluids. The resulting products show an open cell porous network, and can be used for a variety of applications in medical fields, textiles, separation science and others. The invention also provides methods for obtaining such products.

20 Claims, 4 Drawing Sheets

→ Process path
—·—·— Liquid-vapor coexistence for solvent
- - - - - - Cloud point or volume-phase transition of polymer/solvent system
═══ Melting curve of polymer/solvent system
● Critical point of pure solvent
[1] Initial state of preshaped, crosslinked polymer
[2] Melting conditions
[3] Swelling conditions
[4] Crystallization conditions
[5] State after venting

OTHER PUBLICATIONS

Whaley et al., "Crystallization Of Polymers From Supercritical Solution: Low–Density, Porous Isotactic Polypropylene", *Polym. Prepr. (Am. Chem. Soc., Div. Polym. Mat. Sci. Eng.)*, 1995, 73, 404.

Colman et al., "Solid–Fluid and Liquid–Gas Equilibria of Linear Polyethylene with Supercritical Propane", *Department of Chemical Engineering, State University of New York at Buffalo, Buffalo, New York, 14260*, vol. 31, No. 1, Apr. 1990, pp 675–676.

Condo et al., "Phase Equilibria of Linear Polyethylene with Supercritical Propane", *Macromolecules* 1992, 25, 750–753.

P. Ehrlich and D. J. Ehrlich, "Ultralow–dielectric–constant Foams by Crystallisation from Supercritical Solution: Application to Advanced Electronic Packaging", *Advanced Materials For Optics and Electronics*, 1992, vol. 1, 249–253.

Bush et al., "Lamellar Structure and Organization in Polyethylene Gels Crystallized from Supercritical Solution in Propane", *Macromolecules* 1991, vol. 24, No. 6, pp 1439–1440.

Pradhan and Ehrilch, "Morphologies of Microporous . . . in Supercritical Propane", *Journal of Polymer Science*, vol. 33, Nov. 7, May 1995, pp 1053–1062.

Andrianova and Pakhomov, "Porous Materials From Crystallizable Lpolyolefins Produced by Gel Technology", *Polymer Engineering and Science*, Aug. 1997, vol. 37, No. 8, pp 1367–1380.

Prasad et al., "Supermolecular Morphology . . . Heterogeneous Solutions", *Journal of Polymer Science: Part B: Polymer Physics and Physical Chemistry*, vol. 31, No. 12, 1819–1835, Nov. (1993).

Lele and Shine, "Morphology of Polymers Precipitated from a Supercritical Solvent", *AIChE Journal*, vol. 38, No. 5, pp 742–752, May (1992).

Matson et al., "Rapid Expansion . . . Thin films, and Fibers", *Ind. Eng. Chem. Res.*, 1987, 26, 2298–2306.

Petersen et al., "The Formation of Polymer Fibers from the Rapid Expansion of Supercritical Fluid Solutions", *Polymer Engineering and Science*, vol. 27, No. 22, Dec. 1987, pp 1693–1697.

Kumar and Suh, "A Process for Making Microcellular Thermoplastic Parts", *Polymer Engineering and Science*, Oct. 1990, vol. 30, No. 20, pp 1323–1329.

Goel and Beckman, "Generation of Microcellular Polymeric . . . Temperature on Nucleation", *Polymer Engineering and Science*, Jul. 1994, vol. 34, No. 14, pp 1137–1147.

Goel and Beckman, "Generation of Microcellular Polymeric . . . Cell Growth and Skin Formation", *Polymer Engineering and Science*, Jul. 1994, vol. 34, No. 14, pp 1148–1156.

Cooper and Holmes, "Synthesis of Molded Monolithic Porous Polymers . . . Porogenic Solvent", *Advanced Materials*, vol. 11, No. 15, Oct. 20, 1999, pp 1270–1274.

* cited by examiner

CRYSTALLIZATION OF CONSTRAINED POLYMERS

CROSS-REFERENCE TO RELATED APPLICATIONS

This application claims the benefit of U.S. Provisional Patent Application Ser. No. 60/157,201, filed Sep. 30, 1999, which is incorporated herein by reference in its entirety.

STATEMENT OF GOVERNMENT RIGHTS

The work described herein has been partially funded by a grant from National Environmental Technology for Waste Prevention Institute (NETI) at the University of Masachusetts, Amherst. The government may have certain rights in this invention.

FIELD OF THE INVENTION

The invention relates to porous polymers and solid-state expansion processes using solvents. The processes can be used to make porous films, fibers, tubes, and coatings for use in filters, chromatography and numerous other applications.

BACKGROUND OF THE INVENTION

Porous semicrystalline polymers have a range of important and useful applications. In typical applications, the control of pore structure and purity of the product, bulk mechanical properties, and macroscopic shape are of fundamental importance.

Porous semicrystalline polymers can be produced by crystallization from solution. In the well-known process of thermally induced phase separation (TIPS), the porous material is formed from homogeneous solution by lowering the temperature, inducing crystallization, and/or liquid-liquid phase separation. The TIPS method involves dissolving a polymer in a solvent. The solid product forms from solution, either assuming the shape of the crystallization vessel, or becoming film or sediment at the bottom of the vessel. This method cannot be used to create complicated shapes (e.g. complicated injection molded parts). Complete removal of solvent (e.g., drying) is generally difficult (often a second solvent is used to extract the first solvent) and the surface forces of the solvent can lead to pore collapse during removal. Problems associated with current methods include: inability to control fine pore structure and pore size distribution, lack of mechanical coherency in the product, reliance on hazardous processing solvents, and solvent removal and recovery from the final product. Other methods such as foaming, sintering, stretching, and leaching have also been developed over the years to create porous materials with desired properties.

Increasingly strict environmental legislation has forced many industries to reevaluate their use of hazardous solvents. International agreements such as the Montreal Protocol (1987), the Clean Air Act Amendments (1990), and the Kyoto Summit (1997) have all had as their focus the reduction or elimination of volatile organic compound (VOC) emissions as a way to stop ozone depletion and greenhouse warming. The polymer industry in particular is notorious for its reliance on VOCs, which have been used as monomers, solvents, plasticizers, and cleaning agents in polymer synthesis and processing.

SUMMARY OF THE INVENTION

The invention is based on the discovery that crystallizing constrained polymers from swollen states can lead to porous structure, including open celled, bicontinuous porous structure. Solvents can include supercritical fluids (SCF). After crystallization, from the swollen state the polymers show an increase in volume, a decrease in density, and the overall shape is controlled by the shape before swelling and the processing history. Scanning electron micrographs of the samples show an open cell porous, network.

In one aspect, the invention provides a new process for creating porous polymers, the pore structure and distribution of which can be controlled through material properties and processing parameters. The process is applicable to many different types of polymers. The final shape of the porous polymer is determined by shaping methods such as extrusion, blow molding, fiber spinning, and injection molding applied prior to the process, as well as by material properties, and further processing history.

In another aspect, the invention provides porous polymeric materials with open pore structures having new morphologies, improved pore size distribution, and improved mechanical strength. These porous polymers are produced in such a way that all interior surfaces are extremely clean, and do not contain residual materials (such as residual solvents, for example) which are typically introduced by previously used processes. This property can reduce or eliminate the need for post-processing cleaning, and can make the porous polymers amenable to further processing such as surface modification, surface functionalization, or biological and medical applications.

The invention, in some embodiments, further provides porous materials of increased strength, by virtue of a crosslinked structure. The shaping of polymers before processing is also substantially maintained during processing, which results in porous materials having a wide variety of shapes that were previously unavailable.

In one aspect the invention provides a method for producing porous structure in a polymer. The method includes shaping a polymer; constraining the structure of at least a portion of the polymer; melting the polymer; contacting the melted, constrained polymer with a solvent under conditions, and for a time sufficient to cause at least partial swelling of the polymer; crystallizing the swollen polymer, and removing the solvent, to yield a porous polymer. The solvent can be a supercritical fluid, such as propane. Some of the steps can be performed simultaneously. The shaping can be by reactive extrusion. The structure of at least a portion of the polymer can be constrained by crosslinking, for example, as achieved by radiation, by reacting functional groups on the polymer, by chemical radical-initiation, or by photochemical reaction. The method can also include extracting an uncrosslinked portion of the polymer from the crosslinked portion of the polymer with a solvent before crystallization to produce a solution comprising an uncrosslinked portion of polymer. This method can also include extracting substantially the entire uncrosslinked portion of the polymer from the crosslinked polymer, and can also include impregnating the crosslinked portion of the polymer with a further material, wherein the further material penetrates the interior of the crosslinked portion of the polymer, and can also include impregnating the crosslinked portion of the polymer with a further material, wherein the further material remains substantially on the exterior of the crosslinked portion of the polymer. The further material can include a polymer, a cell culture, a pharmaceutically active material, a lubricant, or a reactive crosslinking material. The method can also include replacing the solution comprising uncrosslinked portion of polymer with solvent containing substantially no uncrosslinked portion of polymer.

In another aspect, the invention provides a method for making a shaped material. The method includes allowing a solidifiable material to impregnate the interior of a porous structure; solidifying the solidifiable material; and removing the porous structure to produce a shaped material. The porous structure can have pore sizes between about 0.01 μm and 100 μm. The solidifiable material can be an inorganic sol, such as a metal alkoxide or metalloid alkoxide.

In another aspect, the invention provides a porous crosslinked polymer having pore diameters from about 0.01 μm to about 100 μm, and having a open-cell, bicontinuous structure. This porous crosslinked polymer can form part of a tissue scaffold, a catalyst substrate, a liquid or gas filter.

In another aspect, the invention provides a method for growing cells including providing a porous crosslinked polymeric scaffold; at least a portion of the surface of which is coated with cells; and allowing the cells to grow for a time, and under conditions, sufficient to produce new cell. The cells produce a material excreted into an extracellular matrix, or the cells and new cells form tissue.

In another aspect, the invention provides a battery separator comprising a porous crosslinked polymer.

In another aspect, the invention provides a porous polymer having pore sizes between about 0.1 μm and 100 μm. The volume porosity can be of from about 1% to about 90%, and can have an open-celled, bicontinuous pore structure.

The invention provides a number of advantages. The process is markedly simpler and more cost efficient than previous methods. Standard polymers can be employed in the process, rather than only high cost specialty polymers required of prior processes. The shaping of the polymer can be carried out in steps separate from pore generation. The variety of shapes and relative dimensions possible (thin, thick, round, flat, surface coating, bulk material) is greater than that enabled by prior processes. The product is substantially clean, and can be readily used in medical applications. The new process avoids the use of hazardous or environmentally damaging solvents, for example those with volatile organic components. The solvent can be recovered in a useable form after use, and solvent use is thereby reduced. The new processes described herein are ideal for high yield and large scale production, such as reactive extrusion. The processes are useful for inexpensive commodity polymers, and can replace foaming or TIPS.

The polymeric products have a regular pore structure, and can be used in separations as filters, membranes, or chromatography support. The high surface areas of open cell networks make them ideal candidates for catalyst supports where high surface area-to-volume ratios are crucial. Biomedical applications of open cell networks include scaffolding for tissue growth and controlled-release drug delivery methods. Other applications include textiles having "breathable" laminates or fibers, porous nonwoven materials, thermal insulation material able to pass water vapor, porous precursors for forging (prosthetic devices) or fiber spinning (with pore modifications possible through stretching, with high modulus final products available by ultradrawing), low dielectric coatings for electronic parts and wires, filter applications for liquid purification, membrane separators for gas and liquid separations, support for transport media (such as battery separators, and fuel cell membranes), super absorbing linings for diapers and the like, semi-permeable vesicles or bottles (for controlled release), introducing porosity into closed cell porous materials such as foams, templates for producing inorganic porous materials, and other applications. The articles produced according to these methods take on a wide variety of shapes including films, sheets, tubes, fiber, and bulk forms.

As used herein, "bicontinuous porous structure" refers to pore structures in materials in which a continuous path can be traced through either the pore voids or the pore walls across the material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION OF THE INVENTION

The crystallization of constrained polymers, which are swollen by solvents, preferably supercritical fluids (SCF), produces a porous structure in a sample which maintains its macroscopic shape. The process leads to larger volumes, reduced densities, and, in some cases, reduced mass. Porous structure is visible in cross-sections of the samples after exposure. The methods described herein produce stronger porous polymers than previously available, and porous polymers which are produced in a wider range of geometries than previously available.

Without being limited by any particular mechanism, it is believed that crosslink density and swelling conditions control a mechanism in which chain segments between crosslinks crystallize, independently or in association with other crystallizable materials present, while being anchored into a sample-spanning matrix. Crosslink density and process conditions can be varied to control pore structure.

Figure 1:
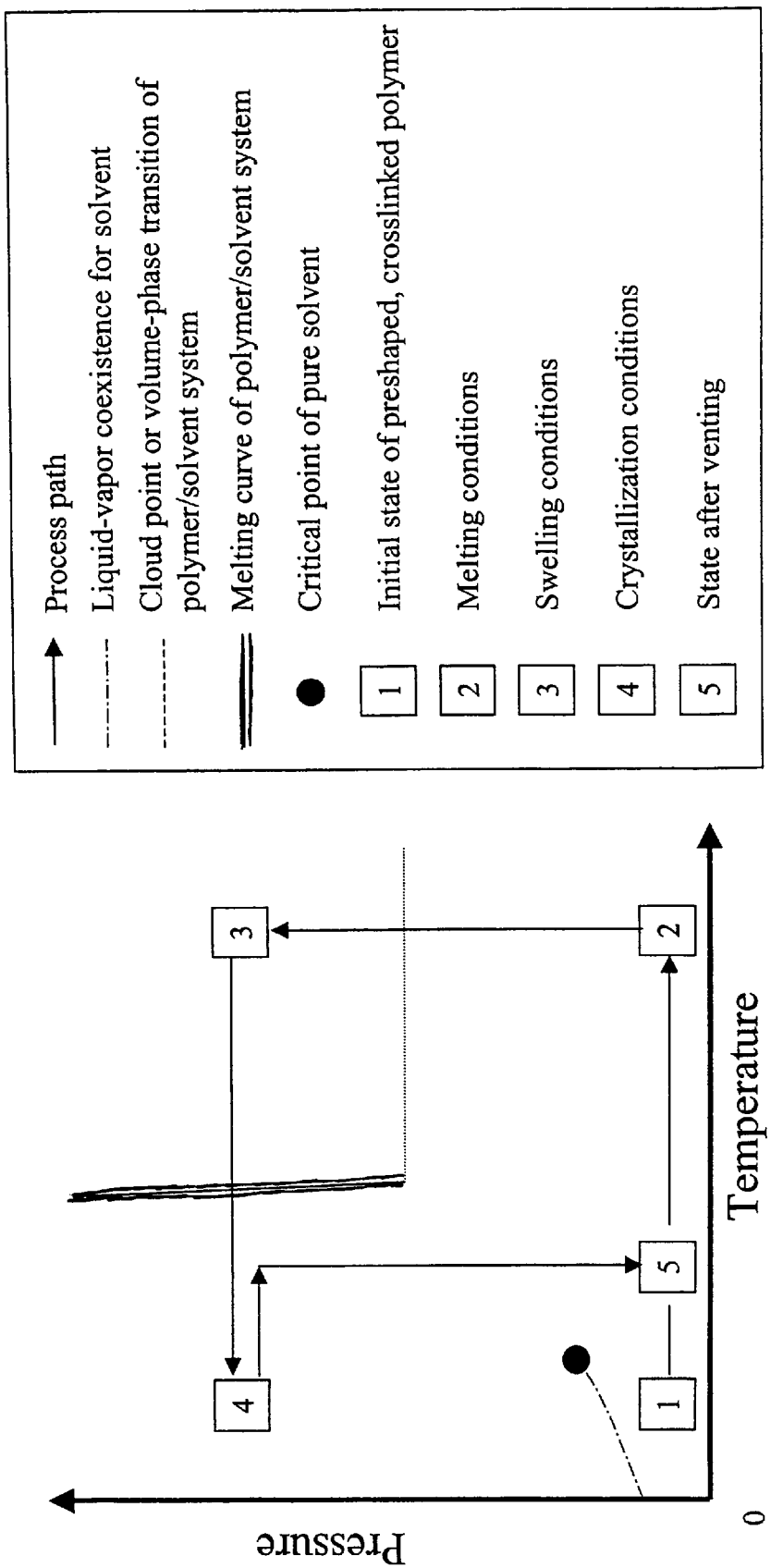
FIG. 1 is a schematic diagram of the crystallization of polymer in a supercritical fluid (SCF).

Supercritical fluids are preferred as swelling fluids because they allow for complete removal of the solvent and preserve the fine pore structure as the supercritical fluid exerts minimal surface tension on the polymer. The critical temperature of the supercritical fluid should be less than the melting temperature of the polymer. A schematic of the process is shown in FIG. 1. The initial state of preshaped, crosslinked polymer is shown as 1. The material is also in contact with a solvent. The polymer and solvent are first brought to thermodynamic conditions (for example, pressure and temperature) in which the polymer crystals are molten (shown as 2) and the constrained network is swollen (shown as 3), then cooled below the melting temperature of the swollen polymer (shown as 4), and finally, the solvent is vented above its critical point, to give the material shown as 5, which is then cooled to ambient conditions. The cooling from state 3 to state 4 need not be isobaric, as is shown in FIG. 1, but the process path should cross the melting curve of the polymer/solvent system above the pressure which determines the volume-phase transition of the polymer/solvent system. Additionally, the change in temperature shown between states 4 and 5 need not be carried out, rather the temperature may remain significantly constant between these states. Further swollen states may exist within the region containing state 3, which can be explored using variable temperature and pressure within this region of the phase diagram. Such varying swollen states can yield varying polymer morphologies, and varying pore structures. The crystallization temperature can be less than the final venting temperature.

Crystallization from supercritical fluid is now possible for constrained systems, for example, crosslinked linear low density polyethylene.

The method generally involves the following steps. First a polymer is selected. The polymer should be desirably constrainable, for example, crosslinkable. Multi-component polymers such as copolymers and blends, of which only some components are crosslinkable, can also be used in the invention. Polymers that contain dispersed particles can also be used. For example polymers with from about 10% to about 90% crystallinity at room temperature, or from about 20 to about 70% crystallinity at room temperature, can be used successfully. For example, polyalkylenes such as polyethylene and polypropylene; polyoxyalkylenes such as polyoxyethylene and polyethyleneglycol; polylactones, such as polycaprolactones and polylactones of other ring sizes; polyarenes, such as polystyrene and substituted polystyrenes; polyvinyls, including polyvinyl chlorides; fluoropolymers; polyamides such as nylon-6,6, and nylon-6; polycarbonates; polyesters such as poly(butylene terephthalate) and poly(ethylene terephthalate); polyethers such as poly(phenylene oxides), polyethersulfones, polyetheramides, and polyetherpolyketones; alkylene oxide polymers such as poly(ethylene oxide), propylene oxide polymers and higher 1,2-epoxide polymers; polyvinyls such as polyvinyl chloride; phenolic; and polyimides. Biocompatible or biodegradable polymers such as ethylene vinyl acetate, poly(lactic acid coglycolic acid), poly(lactic acid coglycine acid) can be used, as long as the crystallinity of these materials is sufficiently high. The polymers for use in the processes described herein can also be block copolymers with at least one crystallizable phase, polymer blends with at least one crystallizable component, blends of homopolymers and copolymers, and crystallizable suspensions.

The polymers are to be provided in a constrained configuration, which is stable or metastable. This can be achieved by a number of methods, for example, by crosslinking of the polymer, or by establishing an electromagnetic field which would substantially immobilize and/or orient the polymer, or by controlling ion concentration in polyelectrolytic materials. Constraint by the application of an electromagnetic field can be achieved by providing a polymer which is intrinsically ionic, or intrinsically polarizable, or by providing a polymer having ionic, or polarizable groups. The polymers can be crosslinked by any of numerous generally known mechanisms including radiation-induced crosslinking, chemical radical-type crosslinking, grafting, including silane grafting, and other methods of crosslinking, for example those based on the presence of functional groups (for example, ionic and counterionic groups which can interact with each other) on the polymer. Photochemical crosslinking with visible, ultraviolet or infrared radiation is envisoned, carried out by irradiation of a separately added or pendant chromophore that can generate species which achieve crosslinking between polymer chains. Such chromophores are known in the art and include dyes, aromatic molecules and substituents, heteroaromatic molecules and substituents, and other commonly used crosslinking chromophores and moieties. The chemical radical-type crosslinking can require impregnation of radical-generating species into the polymer to generate radicals. For example, peroxide can be used as a radical-generating species. Grafting-type crosslinking can use reactive extrusion with radical generating species (for example, peroxide) to graft functional groups (such as silanes) to the polymer, which is subsequently crosslinked by hydrolysis and condensation.

Second, the polymer is shaped or processed into a desired geometry by conventional means, including extrusion of a sheet, tube (hollow fiber), or fiber, injection molding, surface coating onto a substrate, impregnation of a porous substrate, small particle formation, conventional foaming, and other processes known in the art. Concurrently, the creation of a chemically crosslinked or otherwise constrained network can be carried out, or this can be accomplished in the next step of the inventive method.

Third, the polymer is typically crosslinked, or otherwise constrained. For example, chemical crosslinking can be carried out by the addition of chemical crosslinking agents, for example those which allow radical-generating species to generate radicals. Hydrolysis or other chemical activation of functional groups can be carried out. Alternatively or additionally, crosslinking can be induced by processes involving radiation. Vulcanization, conventional end-linking processes, or reactive extrusion are also useful means of crosslinking the polymer. Crosslinking locks the polymer into a network so that exposure of the polymer to solvent does not result in complete disruption of the structure of the polymer. The extent of crosslinking can be used to tune the resulting structure. The extent of crosslinking can be defined by the "gel fraction," or mass fraction remaining after non-crosslinked molecules are extracted. Polymer chains which are not crosslinked (that is, "loose chains") form what is known as the sol fraction, and can be removed by exposure of the partially crosslinked polymer to solvent, under certain conditions. In some embodiments, the crosslinking is deliberately carried out to a degree less than completion (for example, from about 10% to about 80% gel fraction). The sol fraction is an important processing parameter, particularly during the next step, and it can optionally be partially or completely removed at this stage. The extent of crosslinking which can give open celled, bicontinuous pore structure varies according to the material and the method of crosslinking used. For example, for peroxide crosslinked HDPE, gel content of between about 50 and about 80%, or between about 60% and about 70% will give open celled, bicontinuous pore structure. For example, for radiation crosslinked linear low density polyethylene, gel content of between about 10 and about 40%, or between about 15% and about 30% will give open celled, bicontinuous pore structure. For example, for silane grafted HDPE, gel content of between about 15 and about 60%, or between about 25% and about 45% will give open celled, bicontinuous pore structure. Gel contents significantly above the given ranges can tend to give non bicontinuous structure, and gel contents significantly below the given ranges can tend to produce dissolution of the polymer in solvent.

In alternative methods, the polymer could be prepared by constraint in the molten, or partially molten, state. If crosslinking constrains the polymer, this would change the location of the crosslinks, and thus affect the final pore structure. For radiation-induced crosslinking of crystallized polyethylene, for example, it is known that crosslinking occurs preferably in the amorphous regions. If crosslinking occurs in the melt, the crystallizable regions are not excluded.

According to the general process, the polymer is next swollen by exposure to a solvent which swells the network structure, while maintaining the integrity of the network. The uncrosslinked polymer is at least partially soluble in the solvent under these conditions. The crystal phase of the polymer is melted in the presence of solvent at this stage, for example, by exposure to heat or increased pressure, to facilitate swelling of the polymer by the solvent. Solvents useful for this purpose can be liquid, gas, or supercritical fluid. Conventional solvents, including benzene, xylene, toluene, and other solvents in which the uncrosslinked polymer precursor is at least partially soluble can also be useful for these purposes. The solubility of the polymer in solvent is typically increased by increasing temperature or pressure. For example, the second critical endpoint for a high molecular weight fraction of linear polyethylene in propane lies at about 118° C. and 640 bar, and the cloud point decreases slightly with increasing temperature. Polymers and solvents which can be used together include polyethylene or polypropylene and propane, polyethylene or polypropylene and xylene, aliphatic polyester and supercritical carbon dioxide, fluoropolymers and supercritical carbon dioxide.

The amount of swelling is an important processing parameter and, under equilibrium conditions, depends on solvent quality and network structure. For example, xylene used at relatively low temperature (such as 110° C. for polyethylene) can swell polyethylene or polypropylene to a relatively large degree, while supercritical propane swells these polymers to a more moderate degree. Other supercritical hydrocarbons such as methane and ethane also induce less than maximal swelling of polyethylene and polypropylene. The degree of swelling induced by a given solvent can be controlled by tuning with temperature, pressure, with the connectivity of the polymer, or with the presence of co-solvents, as are commonly used in conjunction with fluoropolymers. The swelling induced by a solvent is resisted by the network structure introduced in the previous step. If too few crosslinks are created, the polymer will tend to dissolve and if too many crosslinks are created, the network will be unable to swell. Variations in the intermediate range of crosslinking lead to different resultant pore structure. The optimum crosslink density depends on the material used, and the pore structure desired.

Partial swelling (any swelling less than a maximum swelling) can be used to create products according to the invention. The extent of swelling can also be controlled by constraining the polymer to be in a vessel of a given dimension. Additionally, by limiting the amount of solvent available, the degree of swelling can be limited. By limiting the amount of time available for swelling, partial swelling and gradients in the degree of swelling across the sample may be achieved.

During swelling, any sol fraction tends to be extracted from the polymer. This diffusion process depends on swelling time, sample geometry, and solvent concentration, and reduces the mass of the polymer. The reduction in mass can range from about 10% to about 75%, or from about 20% to about 50%. Gradients of sol fraction may be introduced across the sample. Sol fractions remaining in the polymer participate with the gel fraction during the following crystallization step. The degree of sol extraction is expected to have significant influence on the final morphology, that is, the structure of crystal lamellae, specific surface area, pore size distribution, as well as the flexibility of the final product, and the like. Therefore, partial or complete sol fraction extraction may be desired. Sol fractions removed from the sample can accumulate in the surrounding solvent and precipitate upon return to ambient conditions. The accumulation of sol fraction in the surrounding solvent can be limited by solvent replacement during swelling. Additionally, by the same mechanism, materials (e.g., co-crystallizing species, immiscible species, reacting species, additives, surface modifiers) dissolved in the solvent can be impregnated into the polymer, or onto its surface, during the swelling step to modify final properties. The distribution between surface localized and interior localized material can be determined by the amount of time allowed for penetration. Additionally, the materials present in the polymer (additives, stabilizers, plasticizers and the like) which are introduced during polymer processing can be extracted by the swelling procedure. These materials can be reintroduced into the polymer, or onto its surface, by allowing such materials, added to solvent, to contact the polymer. Material properties can also be modified during the swelling phase by the application of mechanical stresses (as in bi-axial stretching, or drawing) or by secondary processes (such as using a third component to foam the polymer within the swollen gel region).

In preferred embodiments of the invention, supercritical fluid is used as a solvent. The unique physicochemical properties of supercritical fluids, for example, their very low surface tension and densities in the liquid phase, along with the high molecular mobilities of the gas phase, make them useful for the processes described herein. Such solvents could potentially dissolve the polymer if crosslinks were not in place to restrict the solvent uptake. Supercritical fluids useful for purposes of the invention include carbon dioxide, sulfur hexafluoride, freons (e.g., fluoroform, monofluoromethane, dichloromethane, chloroform, chlorotrifluoromethane, and chlorodifluoromethane), $C_{1-4}$alkanes such as ethane and butane, $C_{1-4}$alcohols, $C_{2-4}$alkenes such as ethylene, and $C_{2-4}$alkynes such as acetylene, and other similar compounds. Combinations are also useful, including the above materials used in combination as cosolvents.

In a further step, the polymer is supercooled below its melting temperature. This step results in crystallization and phase separation of the polymer from the solvent. Physical gelation constrains the overall shape of the swollen polymer, and a porous physical morphology is created. Crystallization temperature and cooling rate can affect the size and structure of the physical network. Volume changes can occur at this stage, but tend to be relatively small.

Lastly, the solvent is removed by venting as a supercritical fluid or as a gas. Fine pore structure is preserved, as there is very low surface tension in these states. Excessive surface tension can degrade the structure of porous polymers, and can prevent complete removal of solvent or penetration of externally introduced materials because of a loss of open cell structure. If a solvent other than SCF is being used, it is preferably exchanged with an SCF or a gas before venting. The venting step is desirably carried out at a temperature above the critical temperature of the fluid to avoid the formation of a liquid phase and the associated capillary effect in the pores. Complete removal may be assisted by the application of vacuum.

SCFs are easily recovered by controlled venting, reducing waste generation and the necessity for post-processing cleaning. Before reuse as a solvent, the SCF is cooled below its critical point (to transfer it into a phase which is a relatively poor solvent) to shed impurities that might have dissolved in it while in the supercritical state. The low temperature processing conditions and complete solvent recovery typical of SCF technology are ideal for temperature-sensitive medicinal and biological product handling, which demand high purity and may be easily degraded by heat. SCF can also be used to infuse polymer substrates with additives such as dyes, perfumes, and physiologically active materials. The rapid expansion of supercritical fluids can be used to create novel morphologies in foams, powders, films, fibers, and biodegradable microspheres used for drug delivery. Because the solubility of polymers in SCF tends to be highly dependent on molecular weight, SCF can be used to fractionate polydisperse polymers.

This process causes an expansion in the solid state. The increase in volume of the final product can range from about 10% to about 800%, or from about 50% to about 700%, of from about 100% to about 600%. The transformation of a solid piece of polymer (crosslinked and crystallized) into a porous, solid piece (once again crosslinked and crystallized) is carried out without completely liquefying and without external mechanical forces. The forces are supplied completely internally, by the action of solvent, which attempts to separate the polymer molecules from each other until they are held back by the network bonds (crosslinks).

The polymer thus created is solidified in independent ways: by chemical crosslinking by bonds between molecules, and by crystallization of molecules themselves. The chemical crosslinks, once they are formed, remain intact throughout the process. That is, the polymer is a solid at all stages in the expansion phase of the process. Only the crystals are molten prior to reformation in the swollen state. Additional embodiments utilize other types of constraints on molecules (that is, networks) which are stable through the process such as ionic, magnetic, or electric networks and other types of physical structures such as field-induced structures, microphase structures, and other types of intermolecular interactions.

Swelling is associated with the gel fraction in the crosslinked polymer. Gel fractions of crosslinked polymers useful in the processes described herein can be from about 15% or more. Loose molecules (sol fraction) are extracted as the exposure time is increased. This behavior has been observed when SCF was used with crosslinked polydimethylsiloxane (PDMS) as a model crosslinked polymer. The degree of sol extraction is expected to have significant influence on the final morphology, that is, the structure of crystal lamallae, specific surface area, pore size distribution, and the like. The external shape of the final product and its pore structure are mostly determined by the crosslinking and phase separation in connection with the phase separation due to crystallization.

The properties of the resulting polymers are highly advantageous for a large number of applications. The pore sizes can range from about 10 nm to about 100 $\mu$m, or from about 200 nm to about 50 $\mu$m, or from about 250 nm to about 10 $\mu$m, with distribution in pore sizes ranging from about 10 nm to about 1 $\mu$m. The volume porosity can range from about 1% to about 90%, or from about 5% to about 80%.

Applications of Porous Polymers

Porous polymers find utility in a great number of fields. For example, many applications in separation technology will find use for porous polymers described herein. These separation technology applications include filtration of gases, filtration of liquids, chromatographic applications, and transport applications such as ion transport and fuel cell transport media.

For example, battery separators can be fabricated from porous polymers as produced herein. Battery separators are thin membranes that physically divide the battery cathode from the anode to prevent short circuiting. The requirements are thicknesses of from about 1 to about 2 mil (or, for example, down to about 0.125 mm), pliability, porosity, hydrophilicity, tensile strength, and conformability. The total porosity volume of the separator, the structure of the pores in the separator, and the tortuosity of the pore paths through the separator are particularly important parameters to control for optimum performance. The performance of alkaline battery cells can be improved by either decreasing the tortousity of the path through the separator, or by decreasing the thickness of the separator. Porous polyethylene including highly crosslinked polyethylene, prepared as described herein, can be a useful material for applications as battery separators.

Porous polymers are also useful in catalysis and other fields that rely on high surface areas of the materials produced according to the processes described herein.

Porous polymers are also useful in fields that utilize the structural properties of the bulk material. For example, the porous polymers described herein can be used as a scaffold for tissue growth, for controlled release applications, or for encapsulated cell culture applications. The fact that the porous polymers are prepared by a process involving steps that effectively clean the interior surfaces of the pores makes them particularly useful for such biological applications.

The porous polymers described herein can also be used to serve as a scaffold in a method to prepare other materials. In some embodiments, this method is performed by creating a porous polymer structure according to methods described above, impregnating the structure with another material, and subsequently removing the porous polymer. The porous polymer can be removed by a number of known methods, including chemical or physical reactions, such as reactions with an acid or base, by burning, or by phase transformations of the porous polymer. It is understood that such methods of porous polymer removal will be effective as long as the methods have differential effects on the porous polymer and impregnating material. These processes result in a cast of the impregnating material, which has an external shape with high surface area corresponding to the high surface area of the inner walls of the pore structure of the discarded porous polymer. The impregnating material can have its own pore structure, intrinsic to the material and the method in which it is formed. In this way, the surface area of the impregnating material can be made to be far higher than the surface area of the porous polymer. For example, sol gel chemistry (with metal oxides, or metal alkoxides, or metalloid oxides, or metalloid alkoxides) carried out inside a template of porous polymer described herein typically involves the generation of water and methanol, which result in pore structure of the resulting gel.

EXAMPLES

The invention will be further described in the following examples, which do not limit the scope of the invention described in the claims.

Example 1

Preparation of Polymer in Supercritical Fluid with Radiation Crosslinking

Experiments were conducted with LLDPE synthesized with metallocene catalyst. The sample was pressed into 100 mm×2 mm sheets at 160° C. under vacuum. Chemical crosslinking was induced by exposure to 5 Mrad of radiation.

After crosslinking, some samples were extracted in a Soxhlet apparatus with p-xylene for 24 hours to remove non-crosslinked material.

The samples of crosslinked material were exposed to propane at 9000 psi and 175° C. for 1 hour and then cooled at the crystallization temperature, ($T_{cryst}$=80° C.–105° C.) for 30 minutes. After this crystallization period, the vessel was vented at 105° C.

The mass of each sample was determined before and after exposure with an analytical balance. Volume increase was determined by measuring the linear dimensions of the rectangular samples. Density was determined as the quotient of mass and volume. However, the shape of the samples became somewhat irregular after exposure, making volume measurements imprecise. Therefore, density was also determined by Archimedes Method. The samples were coated with epoxy and weighed in a solvent of known density to determine sample density. The gel fraction of the crosslinked sample determined by the weight loss after Soxhlet extraction was 20%: The amount of swelling and mass loss after exposure for several different crystallization temperatures ($T_{cryst}$) are shown in Table 1.

In Table 1, "Mass" and "Volume" are expressed as percentage of the original values. Density 1 is the mass/volume. Density 2 is the Archimedes density. Density 3 is the percentage of the original density (the density of the sample before exposure is 0.84 g/cm$^3$). Entries "—" were not determined. The results indicate that mass loss is accompanied by volume increase.

TABLE 1

Properties as a Function of Crystallization Temperature

| Crystallization Temp. (° C.) | Mass | Volume | Density 1 (g/cm$^3$) | Density 2 (g/cm$^3$) | Density 3 |
|---|---|---|---|---|---|
| 80 | 78.5 | 536 | 0.12 | — | 15 |
| 85 | 85.1 | — | — | 0.11 | 13 |
| 105 | 84.8 | — | — | — | — |

Example 2

Scanning Electron Microscopy

Scanning electron microscopy (SEM) was performed on a JEOL brand 20 kV scanning electron microscope. Samples were coated with epoxy, cut with a razor and sputter coated with gold. Top surfaces, 1 surfaces, and 3 surfaces were studied. The surfaces are defined according to an axis system in which the 1 axis is vertical, and the 2 and 3 axes form a plane normal to the 1 axis.

Figure 2:
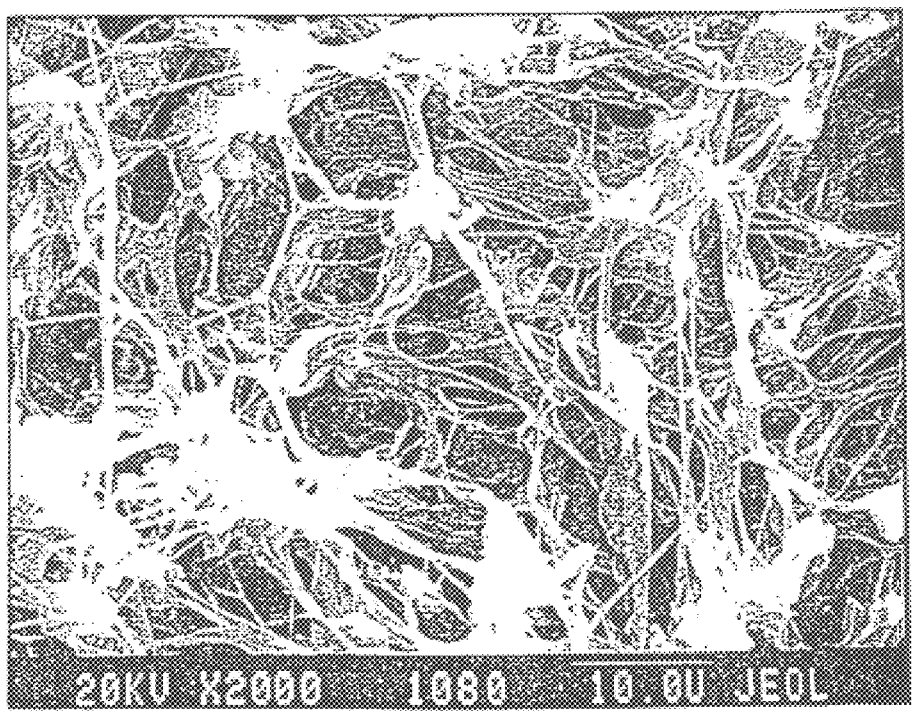
FIG. 2 is a scanning electron micrograph of a 3 surface of an LLDPE sample crystallized at 85° C., recorded at 2000×.
Figure 3:
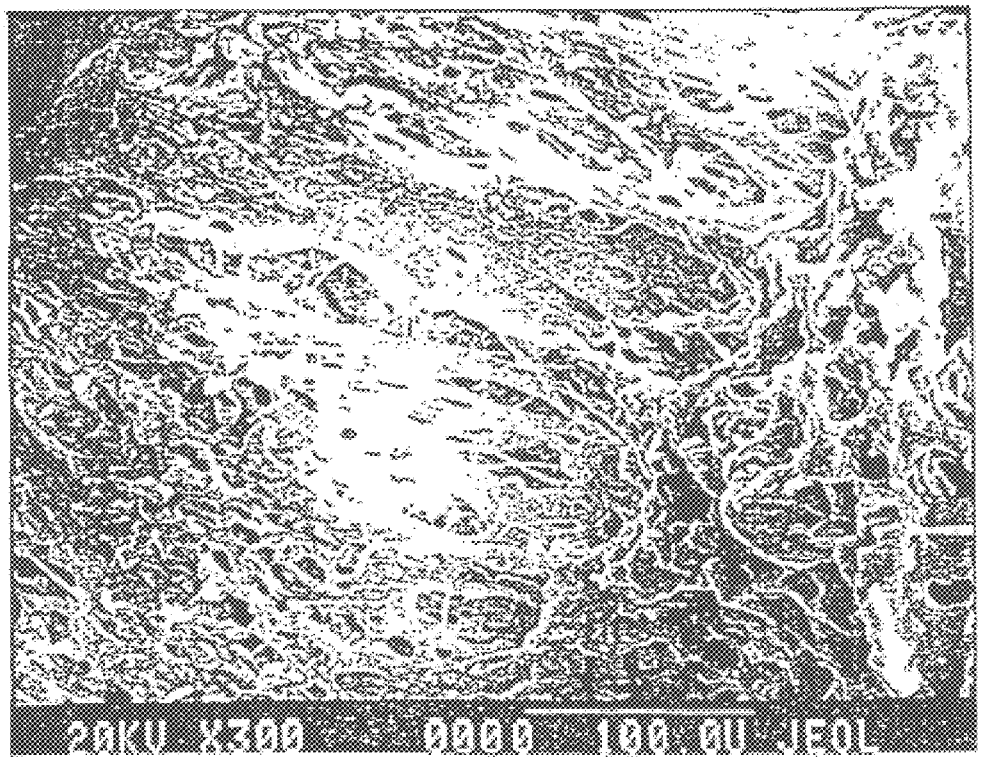
FIG. 3 is a scanning electron micrograph of a 3 surface of an LLDPE sample crystallized at 105° C., recorded at 300×.
Figure 4:
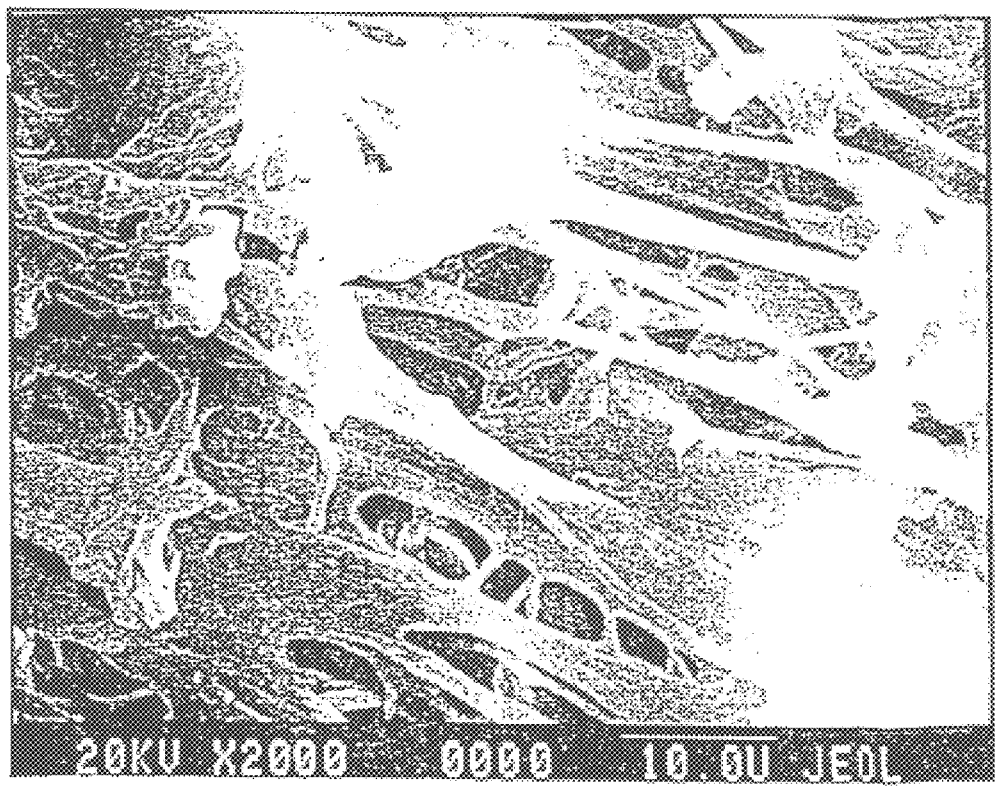
FIG. 4 is a scanning electron micrograph of a 3 surface of an LLDPE sample crystallized at 105° C., recorded at 2000×.

Scanning electron micrographs (SEM) are shown in FIGS. 2–4. Porous structures are visible in the cross-sections shown in these Figs.

Example 3

A Further Preparation of Polymer in Supercritical Fluid with Radiation Crosslinking A metallocene linear low density polyethylene (LLDPE; polyethylene co-hexane, 2.6 mol % C-6, $M_w$ of 110,000, $M_w/M_n$ of 2.4) was molded from pellet form into 100 mm×2 mm discs at 160° C. under vacuum. Samples were exposed to 3 to 16 Mrad of electron beam radiation at room temperature under inert atmosphere to induce crosslinking. The relatively even distribution of branching content in metallocene LLDPEs make them amenable to radiation crosslinking in the solid state, because any given chain is likely to occupy both crystalline and amorphous domains, the latter being where the crosslinking preferentially occurs. Gel content was determined by mass loss after Soxhlet extraction with p-xylene.

Crosslinked polyethylene does not form a solution with supercritical propane, but rather a swollen gel. To ensure thorough swelling, a square sheet (5 mm×5 mm×2 mm) of the crosslinked sample was placed on a small metal tray in a 25 ml high pressure vessel. Vacuum was then applied to the vessel followed by an initial charge of propane to 10 bar. The temperature was increased to 175° C., followed by the addition of propane to 620 bar. After equilibration of 2 to 24 hours, the temperature was reduced to 85° C. for 0.5 hours to crystallize the polymer. The propane was then vented at 105° C., which is above its critical point, so that the pore structure would be maintained.

Figure 5:
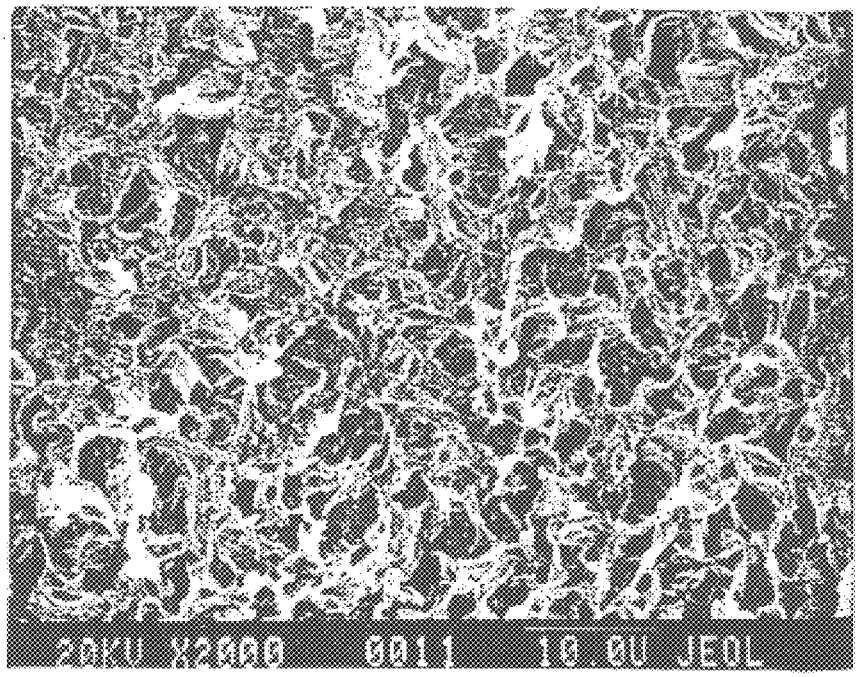
FIG. 5 is a scanning electron micrograph of a surface of a LLDPE sample crystallized at 85° C., recorded at 2000×.

Cross-sections of the samples were prepared by saturating the porous samples with methanol, freezing in liquid nitrogen and then cutting with a razor blade. Cross-sections were sputter coated with gold and then scanning electron microscopy was performed on a JEOL brand 20 kV SEM. FIG. 5 shows the SEM of this sample.

The mass of samples-was determined before and after exposure to supercritical fluid with an analytical balance. Density was determined by Archimedes' method, in which the samples were coated with epoxy and weighed while submerged in a fluid of known density. Volume increase was also determined by measuring the linear dimensions of the samples when possible.

TABLE 2

Mass, Volume, and Density Changes After Processing

| Gel Fraction (% mass) | Mass Remaining (% of original) | Volume Change (% of original) | Density Change (% of original) |
|---|---|---|---|
| 4.1 | 41.4 | NA | NA |
| 15.9 | 54.9 | 329 | 16.7 |
| 56.8 | 70.5 | 92.5 | 76.2 |

The entries marked "NA" were for samples which melted completely and did not retain the pre-processing shape.

The results show that a minimum gel fraction is required, and density reduction is decreased as gel content increases.

Example 4

Preparation of Polymer in Supercritical Fluid with Peroxide Crosslinking

The peroxide initiator, dicumylperoxide, was dissolved in methanol (initiator concentration of 0.07 wt %). Purified high density polyethylene HDPE was poured into the methanol-initiator solution. After stirring and evaporation of solvent at ambient temperature, the powder was placed in a vacuum press to be crosslinked at 200° C. The HPDE had molecular weight of 80,000, with $M_w/M_n$ of between 2.5 to 3.0.

The sample was extracted in a Soxhlet extractor with p-xylene for 24 hours. The mass remaining after extraction (that is, the gel content), was 70.3%. The sample was then swollen in propane at 9000 psi, 172° C. for 2 hours, and then crystallized at 85° C. for 0.5 hours. Venting of solvent was carried out at 105° C.

Figure 6:
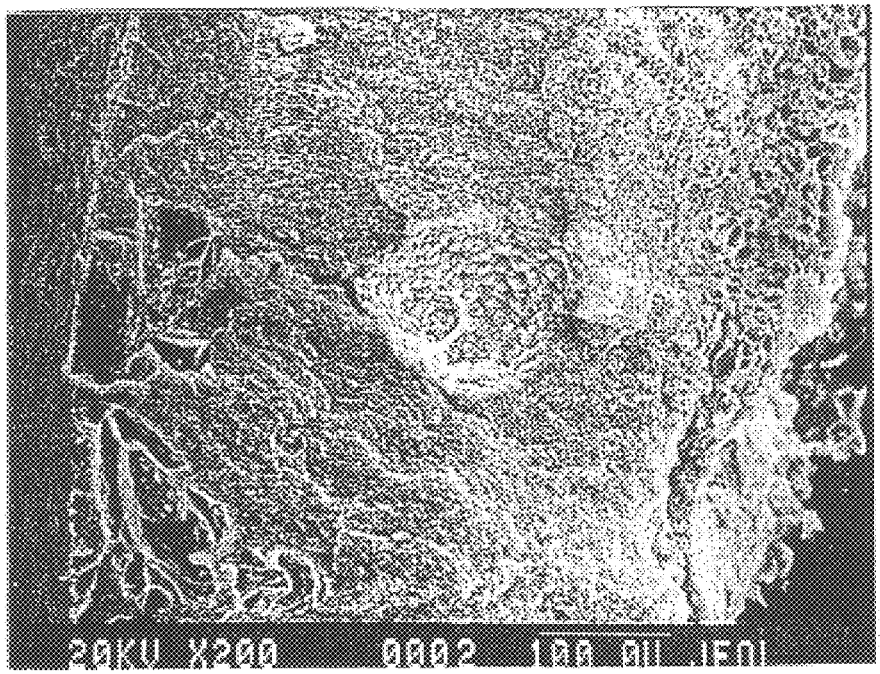
FIG. 6 is a scanning electron micrograph of a high density polyethylene (HDPE) sample prepared by peroxide crosslinking, crystallized at 85° C., recorded at 200×.

The sample was filled with methanol, frozen in liquid nitrogen, cracked and sputter coated with gold for scanning electron microscopy. FIG. 6 shows a scanning electron micrograph of this sample at magnification of 200×.

Example 5

Preparation of Polymer in Supercritical Fluid with Silane-Grafting Crosslinking

High density polyethylene (HDPE) was mixed with vinyl-trimethoxysilane (VTOMS; 1.5 parts per hundred of polyethylene), 2,5-dimethylhexane-2,5-di-t-butyl peroxide (DHBP; 0.05 parts per hundred of polyethylene), and dibu-tyltindilaurate (DBTL; 2 parts per hundred of polyethylene) in a reactive extruder. The sample was crosslinked in warm water until the gel content was 27.4%. The sol fraction was not extracted prior to swelling. The sample was swollen in propane at 9000 psi, at 172° C. for 2 hours, crystallized at 85° C. for 0.5 hours, and the solvent was vented at 105° C. After processing, the mass remaining was 76.3% of the original mass, and the volume had increased by 483%.

Figure 7:
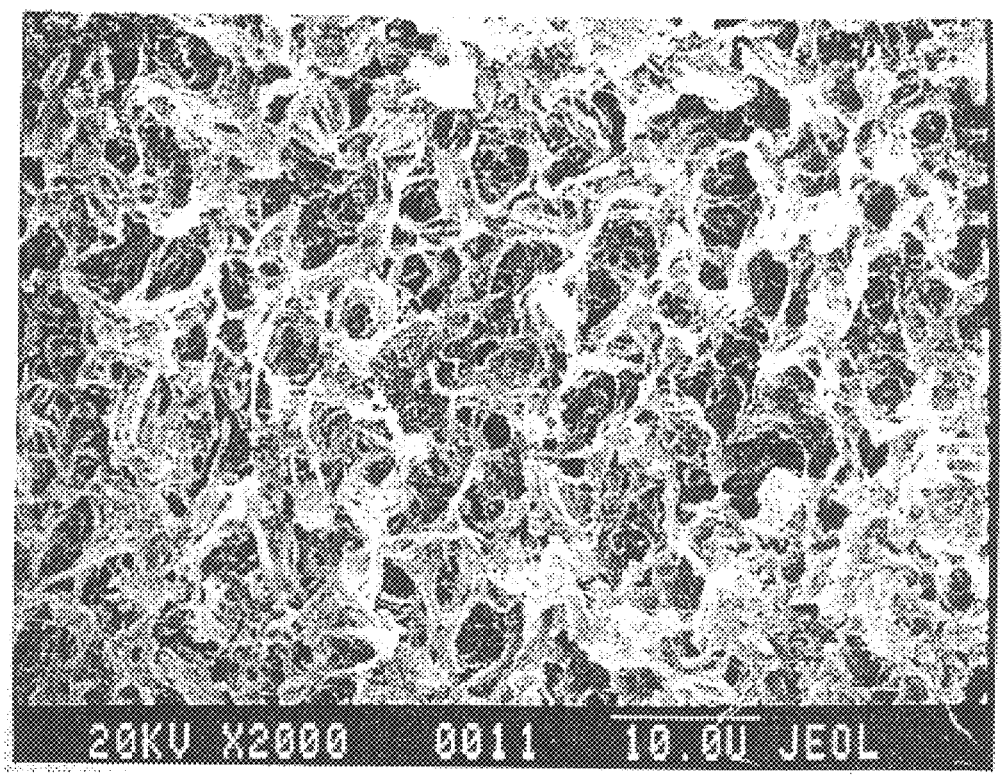
FIG. 7 is a scanning electron micrograph of an HDPE sample prepared by silane-grafting, crystallized at 85° C., recorded at 2000×.

The sample was filled with methanol, frozen in liquid nitrogen, cracked and sputter coated with gold for scanning electron microscopy. FIG. 7 shows a scanning electron micrograph of this sample at magnification of 2000×.

Example 6

Preparation of a Battery Separator from Porous Polymers

A battery separator is made from high molecular weight polyethylene prepared as described in Example 1, except that the polymer is extruded into thin film, or film blown, for example, to a thickness of 0.1 mm. The polymer is crosslinked by radiation, and swollen as described in Example 1, except that the polymer is impregnated with silica particles during the swelling process. The product has pore sizes on the order of 1 micron, and has an overall thickness of about 0.1 mm. In an alternate procedure, the polymer is coated onto a surface, for example, an electrode surface, before crosslinking, then swollen with impregnated silica particles, and further processed as in Example 1 to create a final product with the properties described above.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for producing porous structure in a polymer, the method comprising:

a) shaping a polymer;

b) constraining the structure of at least a portion of the polymer;

c) melting the polymer;

d) contacting the melted, constrained polymer with a solvent under conditions, and for a time sufficient to cause at least partial swelling of the polymer;

e) crystallizing the swollen polymer; and f) removing the solvent, to yield a porous polymer.

2. The method of claim 1, wherein the solvent is a supercritical fluid.

3. The method of claim 2, wherein the supercritical fluid is propane.

4. The method of claim 1, wherein steps a) and b) are performed simultaneously.

5. The method of claim 4, wherein.shaping is reactive extrusion.

6. The method of claim 1, wherein the structure of at least a portion of the polymer is constrained by crosslinking.

7. The method of claim 6, wherein the crosslinking is achieved by radiation.

8. The method of claim 6, wherein the crosslinking is achieved by reacting functional groups on the polymer.

9. The method of claim 6, wherein the crosslinking is achieved by chemical radical-initiation.

10. The method of claim 6, wherein the crosslinking is achieved by photochemical reaction.

11. The method of claim 6, further comprising extracting an uncrosslinked portion of the polymer from the crosslinked portion of the polymer with a solvent before crystallization to produce a solution comprising an uncrosslinked portion of polymer.

12. The method of claim 11, further comprising extracting substantially the entire uncrosslinked portion of the polymer from the crosslinked polymer.

13. The method of claim 11, further comprising impregnating the crosslinked portion of the polymer with a further material, wherein the further material penetrates the interior of the crosslinked portion of the polymer.

14. The method of claim 11, further comprising impregnating the crosslinked portion of the polymer with a further material, wherein the further material remains substantially on the exterior of the crosslinked portion of the polymer.

15. The method of claim 13, wherein the further material comprises a polymer.

16. The method of claim 14, wherein the further material comprises a cell culture.

17. The method of claim 14, wherein the further material comprises a pharmaceutically active material.

18. The method of claim 13, wherein the further material comprises a lubricant.

19. The method of claim 13, wherein the further material comprises a reactive crosslinking material.

20. The method of claim 11, further comprising replacing the solution comprising uncrosslinked portion of polymer with solvent containing substantially no uncrosslinked portion of polymer.

* * * * *